United States Patent
Givens et al.

(10) Patent No.: US 11,799,278 B1
(45) Date of Patent: Oct. 24, 2023

(54) TYPE C COMPACT ELECTRIC TRANSMISSION LINE SUPPORT STRUCTURE

(71) Applicant: INVENTUS HOLDINGS, LLC, Juno Beach, FL (US)

(72) Inventors: Phillip S. Givens, Palm City, FL (US); Chung Jerry Wong, West Palm Beach, FL (US); Robert K. Dunn, Juno Beach, FL (US); Jerry W. Hutcheson, Bunnell, FL (US); Jose R. F. Ribeiro, Miami, FL (US); Keith E. Lindsey, La Canada, CA (US); Miguel A. Flores, Rosemead, CA (US); Thomas R. Koegel, Orland Park, IL (US); Erica Souza Nogueira Bretas, Andover, MA (US)

(73) Assignee: Inventus Holdings, LLC, Juno Beach, FL (US)

( * ) Notice: Subject to any disclaimer, the term of this patent is extended or adjusted under 35 U.S.C. 154(b) by 461 days.

(21) Appl. No.: 17/147,394

(22) Filed: Jan. 12, 2021

Related U.S. Application Data (63) Continuation-in-part of application No. 29/746,184, filed on Aug. 12, 2020.

(Continued)

(51) Int. Cl.
*H02G 7/20* (2006.01)
*H02G 7/05* (2006.01)

(52) U.S. Cl.
CPC ............... *H02G 7/20* (2013.01); *H02G 7/05* (2013.01)

(58) Field of Classification Search
CPC ............ H02G 7/14; H02G 7/20; H02G 7/056; H02G 7/125; H02G 7/12; H02G 1/12;
(Continued)

(56) References Cited

U.S. PATENT DOCUMENTS

| 423,632 A | 3/1890 | Rothenberg |
| 1,616,931 A | 2/1927 | Thomas |

(Continued)

FOREIGN PATENT DOCUMENTS

| CN | 201148761 Y | 11/2008 |
| CN | 102561783 | 7/2012 |

(Continued)

OTHER PUBLICATIONS

Preview high-voltage electricity pylons against blue sky with clouds Stock Photo ID: 127299449 Copyright: gerduess 1999.

(Continued)

*Primary Examiner* — Angel R Estrada
(74) *Attorney, Agent, or Firm* — Fleit Intellectual Property Law; Jeffrey N. Giunta (57) ABSTRACT

An electric transmission line support structure. A first vertical shaft and a parallel second vertical shaft are connected by a crossarm. A first conductor attachment point is connected to the first vertical shaft at a first vertical shaft attachment by a first structural string. A second conductor attachment point is connected to the second vertical shaft at a second vertical shaft attachment point by a second structural string and to the first conductor attachment point by a third structural string. A third conductor attachment point connected to the first vertical shaft at a third vertical shaft attachment point by a fourth structural string and to the second vertical shaft at a fourth vertical shaft attachment point by a fifth structural string. The third vertical shaft attachment point is below the first vertical shaft attachment point, and the fourth vertical shaft attachment point is below the second vertical shaft attachment point.

15 Claims, 4 Drawing Sheets

Related U.S. Application Data (60) Provisional application No. 63/063,079, filed on Aug. 7, 2020.

(58) Field of Classification Search
CPC ............ H02G 7/02; H02G 7/05; H02G 7/053; H02G 7/205; H02G 7/00; F16L 3/1233; F16L 3/00; H01R 4/643; H01R 4/34; H01B 17/40; H01B 17/04; H01B 17/08; H01B 17/12; H01B 17/14; H01B 17/56
USPC ............ 174/40 R, 41, 42, 44, 45 R, 45 TD, 174/40 TD, 176, 137 R, 43; 248/200, 248/205.1; 52/651.02, 651.03, 40, 697
See application file for complete search history.

(56) References Cited

U.S. PATENT DOCUMENTS

| | | | |
|---|---|---|---|
| 1,664,922 A | 4/1928 | Marsh | |
| 2,036,225 A | 4/1936 | Lusignan, Jr. | |
| 3,002,043 A | 9/1961 | Jenner et al. | |
| 3,159,709 A | 12/1964 | Austin et al. | |
| 3,316,342 A | 4/1967 | Cofer | |
| 3,439,107 A | 4/1969 | Scott | |
| 4,398,624 A | 8/1983 | Seddon | |
| 4,458,102 A | 7/1984 | White | |
| 4,679,672 A * | 7/1987 | Seddon | B60M 1/20 174/45 R |
| 4,769,959 A | 9/1988 | Lindsey | |
| 8,122,647 B2 * | 2/2012 | Lee | H02G 7/20 174/45 R |
| 8,952,251 B2 | 2/2015 | Fulk et al. | |
| 9,768,601 B2 | 9/2017 | Fulk et al. | |
| D853,593 S | 7/2019 | Momme et al. | |
| D853,594 S | 7/2019 | Momme et al. | |
| D853,595 S | 7/2019 | Momme et al. | |
| 10,476,249 B2 * | 11/2019 | Lindsey | H02G 7/20 |
| 11,482,848 B2 * | 10/2022 | Urs | H02G 7/053 |
| 11,551,835 B2 * | 1/2023 | Lindsey | H01B 17/40 |

FOREIGN PATENT DOCUMENTS

| | | |
|---|---|---|
| CN | 103175998 | 6/2013 |
| CN | 105140828 | 12/2015 |
| CN | 106677595 | 5/2017 |
| DE | 2424214 | 11/1975 |
| GB | 1077371 | 7/1967 |
| GB | 2288195 | 10/1995 |
| WO | WO2017216402 A1 | 12/2017 |

OTHER PUBLICATIONS

EHV Dead end angle H-frame side view showing the 3-piece X-braces.
Power Tower. Photo by lev.studio.
Pylons/Power Lines Connected Together! 3D Warehouse.

* cited by examiner

TYPE C COMPACT ELECTRIC TRANSMISSION LINE SUPPORT STRUCTURE

FIELD OF THE DISCLOSURE

The present disclosure generally relates to support structures for high voltage electric power lines, and more particularly to physically compact support structures that have reduced requirements for height or right of way width.

BACKGROUND

Electric power utilities distribute electric power to customers that are able to be located at various locations within a large geographical area. The electric power that is provided to customers is able to originate at generation facilities that are located remotely from many of the customers of that electric power. In general, electric transmission lines are used to convey the electric power from the generation facilities to electric distribution facilities located near the customers who are to use the electric power.

Electric transmission lines generally convey three-phase power at high voltages. The three-phase power is conveyed via one or more circuits, where each circuit generally consists of three conductor bundles, which are typically suspended above the ground by electric transmission line support structures. The support structures for electric transmission lines are designed to maintain a minimum separation between each of the three conductor bundles and other conductive surfaces such as other structure components or the ground in order to reduce the occurrences of flashover from those conductors to conductors of different potentials or conductive surfaces of the support structure.

Electric transmission line support structures support the conductors at a specified height above the ground. Suspended electric transmission lines are also placed within a Right-Of-Way (ROW) that has a specified width in a direction perpendicular to the direction of the conductors to ensure a minimum distance between the conductors and other structures or vegetation in order to ensure the safe and reliable operation of the electric transmission line, and minimize the magnitude of electric and magnetic fields at the edge of the Right-Of-Way.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Several characteristics are desirable for electric transmission line support structures that are to be used in newly installed or expanded electric power transmission line systems. It is desirable to have electric transmission line support structures that reduce visual impact, land impact, electric and magnetic fields at the edge of right of way, and that improve the power flow through a given right of way which allows improved acceptance of the electric transmission line system, improves its operation and reduces costs. The below described electric transmission line support structures support the use of compact double circuit 345 Kilovolt (kV) structure(s) that provide effective physical support of the conductors carrying electrical current for each phase of each three-phase AC circuit. Effective support of the conductors of each phase provided by the below described electric transmission line support addresses the following aspects of electric power transmission line operations:

1. Control of corona and field effects caused by increased voltage gradient along the transmission line, which can result in corona induced audible noise and radio interference;

2. Increased reliability by providing adequate phase spacing and phase position to avoid outages due to galloping, and the below described electric transmission line support structures address isolation coordination issues such as live line minimum approach distance, switching surge and lightning impulse voltages, contamination, and avian interaction;

3. The below described electric transmission line support structures further provide effective support for the conductors of the transmission line by providing sufficient mechanical strength and movement of structural strings and hardware assemblies under various weather and load cases.

The below described electric transmission line support structures include characteristics that improve their public acceptance by reducing the visual impact of the transmission line. In some situations, the siting of transmission lines is subject to subjective criteria that are used as a basis for approval of a transmission line route and of the line design and reduced visual impact is desired. The visual impact of an electric power transmission line system is sometimes judged based on the number of transmission line support structures per mile, the structure and transmission line height above ground, and overall footprint of the electric power transmission line system. By reducing the distance between phases in the below described electric transmission line support structures, the height and width of the compact transmission structures are reduced when compared to conventional structures, thus resulting in a reduction in visual impact due to narrower rights of way. The reduced right of way requirements for the below described electric transmission line support structures for electric transmission also advantageously reduces the costs associated with clearing vegetation within the right of way.

The below described electric transmission line support structures provide advantages with regards to land impact and improving power flow. Improving the utilization of existing rights of way and reducing the width of the right of way that is required for the construction and/or installation of a new electric transmission line provides many advantages. The below described electric transmission line support structures allow increasing the amount of electric power that can flow through an existing right of way with a width that is sized for a conventional single circuit 115 kV or 138 kV transmission line while providing the possibility to reduce visual impact via fewer structures per mile and structure heights or widths less than those required for conventional single circuit 345 kV lines. Compared to a conventional single circuit 138 kV line, a double circuit compact 345 kV line can provide more than twenty (20) times the electric power throughput in the same right of way.

The design of the below described electric transmission line support structures advantageously control Electric and Magnetic fields (EM) in the vicinity of the electric transmission lines they support. In some environments, regulations may limit EM field strengths at the edges of right of way of the electric transmission line. In some examples, a wider right of way is used for a particular electric transmission line in order to satisfy such EM field strength limits. The phase compaction and optimal phase arrangement exhibited by the below described electric transmission line support structures reduces EM field strength levels and thus reduces the required width of rights of way to satisfy EM field strength limits. This reduction in EM field strength levels also reduces impacts on adjacent conductive elements like gas pipelines.

The above characteristics of the below described electric transmission line support structures allows the realization of transmission line solutions to power network power flow problems that are more feasible and effective because they require less right of way, provide greater power flow capability than conventional options, reduce visual impacts and land impacts, and limit EM field strengths while providing reliable performance.

Described below are compact electric transmission line support structures that advantageously allow for reductions in structure height, Right-Of-Way (ROW) width, or combinations of these. In general, electric transmission line support structures are desired to have reduced physical height above the ground to reduce the visual impact of the electric transmission line facilities. These electric transmission line support structures are also desired to have reduced requirements for the width of their Right-Of-Way (ROW) in order to minimize the amount of real estate that is required to be dedicated to the electric transmission line, within which land use activities are limited to those which do not affect the safe operation of the electric transmission line.

In order to achieve the reduced height and width requirements for the Right-Of-Way (ROW) for an electric transmission line, the below described compact electric transmission line support structures are designed to support electric transmission lines that include one or more three-phase electric circuits. In these examples, each three-phase electric circuit includes three bundles of conductors, or conductor bundles, with each conductor bundle carrying a different phase of the three-phase electric power. In the below examples, the three conductor bundles in each circuit are supported in a compact delta arrangement. These compact electric transmission line support structures support these three conductor bundles in each circuit with a particular arrangement of structural strings that are attached to the support structure at particular locations as is described in detail below. In some examples, the compact electric transmission line support structures are able to support one or two circuits that each carry three-phase electrical power in order to increase the electric current carrying capacity of the electric transmission line being supported.

In some examples, the structural strings that connect the conductor bundles to the support structure are made of non-conductive porcelain or glass hardware that are connected in a string. In some further examples, the structural strings are able to be composite non-conducting hardware that are constructed of composite materials consisting of fiberglass and polymer material. In the following discussion, conductor bundles are described as being connected to the structure support structure by "structural strings." In the following discussion, the term "structural strings" is able to refer to either suspension structural strings or post structural strings. Suspension structural strings are examples of structural strings that are able to support forces primarily in tension. Although such structural strings are able to support a generally small amount of force in compression, such structural strings are generally considered tension only structural strings. Post structural strings in general can support forces in both tension and compression.

The below described compact electric transmission line support structures support circuits that each have three conductor bundles to carry high voltage, three phase electric power usually over long distances. The support structures for these electric transmission lines are designed to maintain a minimum separation distance between the conductor bundles that carry the current of different phases of the three-phase electrical power. This minimum separation distance among the conductor bundles carrying three different phases is maintained to avoid flashover between phases. The structure of the below described compact electric transmission line support structures advantageously maintain a minimum separation among each of the three conductor bundles that is less than the inter-phase separation of conventional electric transmission line support structures by utilizing a particular arrangement of structural strings to connect the conductors to the support structure.

The design of the below described compact electric transmission line support structures advantageously provides reduced spacing between the conductor bundles carrying the different phases. This reduced spacing between circuits provides a narrow profile that reduces the requirements for the width of the right of way for the electric transmission lines and reduces EM field levels and effects. The below described compact electric transmission line support structures also support the conductor bundle carrying the bottom phase of each circuit independently from the conductor bundles carrying top two phases of those circuits. The arrangements and spacings achieved with the designs of the below described compact electric transmission line support structures further advantageously reduces losses, provides lower impedance, and allows greater utilization of narrow rights of ways for power transmission due to multiple high-capacity circuits. The structure of the below described compact electric transmission line support structures also allows for live line maintenance through provision of adequate work space and adequate minimum approach distance.

The conductors used to carry electric current for each phase are able to be configured as just one conductor for each phase, or bundles of multiple conductors can be arranged in parallel in close physical proximity as conductor bundles to carry the electric current of a particular electrical phase. Such conductor bundles with multiple conductors reduce the impedance and voltage gradient of that electrical phase. In the following discussion, "conductor bundles" is to be understood to include not only bundles of multiple conductors, but "conductor bundles" are also able to describe examples that use only one conductor to carry the electric current of each electrical phase.

The use of conductor bundles with multiple conductors for each phase reduces the voltage gradient of the electrical phases. These bundles of multiple conductors increase the effective conductor radius of each phase to mitigate increases in voltage gradient for each circuit that are caused by reduced distances between the phases of each circuit in the designs of the below described compact electric transmission line support structures and thus reduces the effects of the increased voltage gradient such as corona discharges.

The disclosure herein relates to elements of the design and construction of a transmission line project and corresponding structures. Any hardware implementation, arrangement, or development (including hardware designs, specifications, methods, techniques, procedures, inventions, ideas, as-yet-developed ideas, improvements, enhancements and/or processes) may be used to realize and/or reduce to practice the structures described herein, including assembly and maintenance methods, foundations, conductors, insulators, structural strings, plates, flanges, vangs, grips, posts, clamps, pivot members, chains, universal joints, attachment points, shafts, lattice structures, crossarms, towers, guy wires, mounting locations, and related components while remaining within the spirit and scope of the disclosure.

Figure 1:
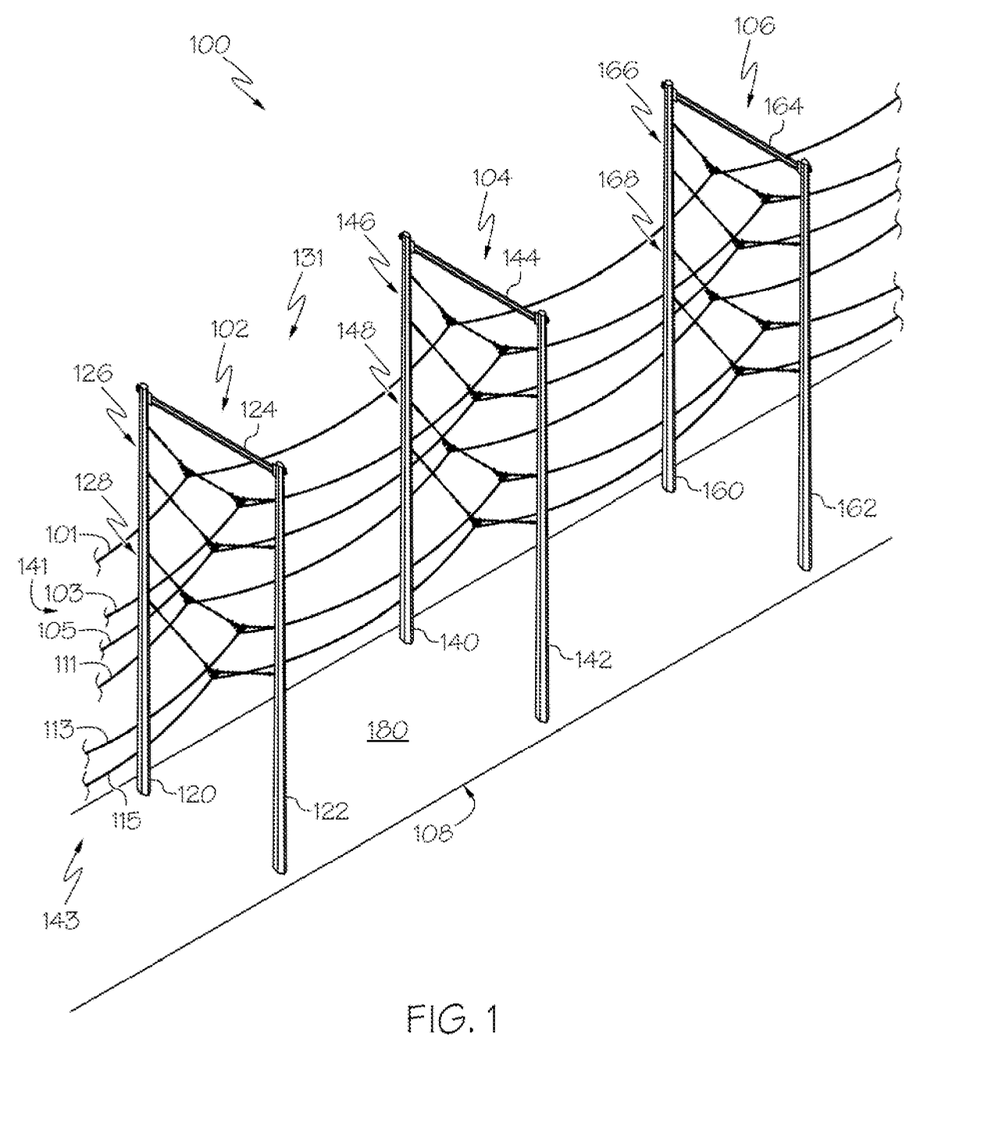
FIG. 1 depicts a portion of an electric transmission line supported by compact electric transmission line support structures, according to an example.

FIG. 1 depicts a portion of a transmission line supported by compact electric transmission line support structures 100, according to an example. The illustrated portion of a transmission line supported by compact electric transmission line support structures 100 depicts three (3) compact electric transmission line support structures, a first structure 102, a second structure 104, and a third structure 106.

The first structure 102 includes a first structure first vertical shaft 120 and a first structure second vertical shaft 122 that are connected at the top by a first crossarm 124. The second structure 104 includes a second structure first vertical shaft 140 and a second structure second vertical shaft 142 that are connected at the top by a second crossarm 144. The third structure 106 includes a third structure first vertical shaft 160 and a third structure second vertical shaft 162 that are connected at the top by a third crossarm 164.

The portion of a transmission line supported by compact electric transmission line support structures 100 depicts a right of way 180. The compact electric transmission line support structures are located within the right of way 180 in order to ensure the safe and reliable operation of the transmission line and minimize the magnitude of electric and magnetic fields at the edge of the ROW 108.

Each of these three (3) compact electric transmission line support structures support two (2) three-phase power line circuits 131 that includes a first circuit 141 and a second circuit 143. The first circuit 141 includes a first circuit first phase conductor bundle 101, a first circuit second phase conductor bundle 103, and a first circuit third conductor bundle 105. The second circuit 143 includes a second circuit first phase conductor bundle 111, a second circuit second phase conductor bundle 113, and a second circuit third conductor bundle 115.

The first structure 102 includes a first structure first set of structural strings 126 to support the first circuit 141 and a first structure second set of structural strings 128 to support the second circuit 143. The second structure 104 includes a second structure first set of structural strings 146 to support the first circuit 141 and a second structure second set of structural strings 148 to support the second circuit 143. The third structure 106 includes a third structure first set of structural strings 166 to support the first circuit 141 and a third structure second set of structural strings 168 to support the second circuit 143. The configuration of these sets of structural strings is described in further detail below.

Each circuit in the illustrated three-phase power line circuits 131 includes three conductor bundles that are arranged in a delta configuration, which is an arrangement where the three conductor bundles form a triangle with internal angles in the range of 30 to 120 degrees. In various examples, each conductor bundle is able to contain a single conductor or multiple conductors that are supported by a connection mechanism at each compact transmission line support structure. The structure of the compact electric transmission line support structures, the connection of the conductor bundles to those structures via a particular arrangement of structural strings, and other aspects are described in further detail below.

Figure 2:
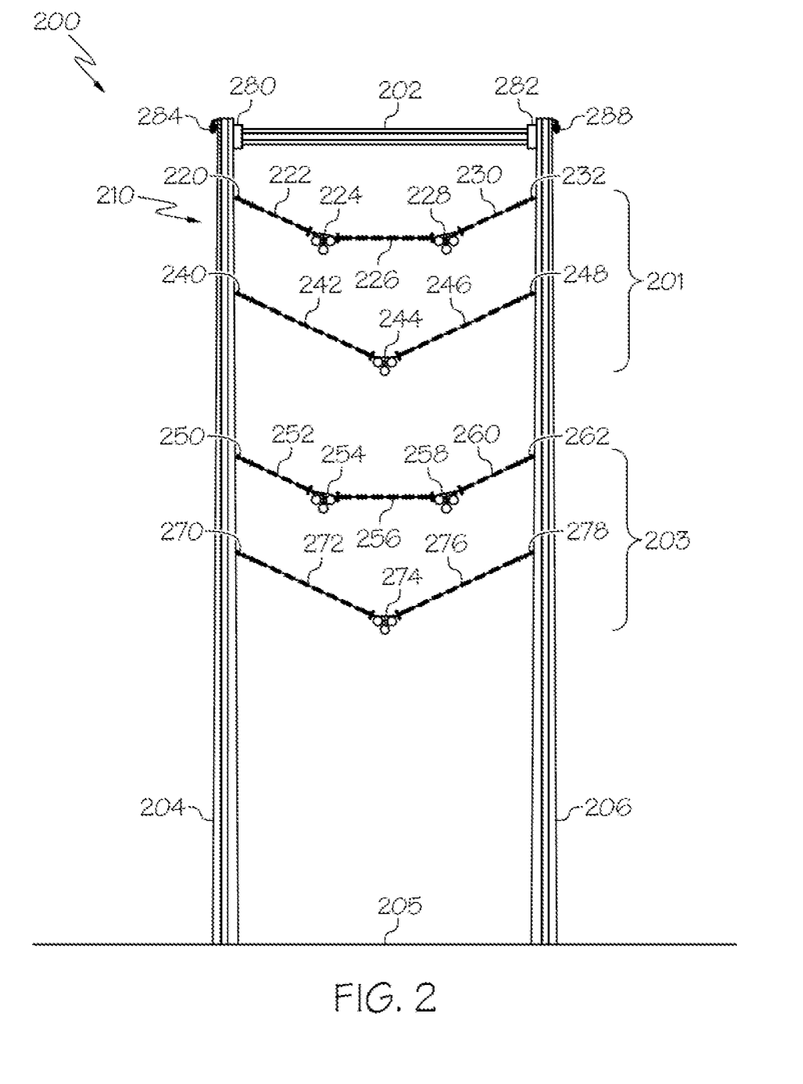
FIG. 2 illustrates a compact electric transmission line support structure configuration, according to an example.

FIG. 2 illustrates a compact electric transmission line support structure configuration 200, according to an example. The compact electric transmission line support structure configuration 200 has a structure that includes a first vertical shaft 204, a second vertical shaft 206 that is parallel to the first vertical shaft 204 and a crossarm 202. In some examples, the first vertical shaft 204 and the second vertical shaft 206 are substantially the same length, but in other examples these shafts may be of differing lengths. The first vertical shaft 204 and the second vertical shaft 206 are mounted on the ground 205 at mounting locations and support one or more three-phase electric transmission line circuits above the ground 205 as is discussed below. In some examples, the first vertical shaft 204 and the second vertical shaft 206 are either able to be directly buried into the ground 205 or installed on top of foundations that are formed in the ground 205, such as is described for the alternative compact electric transmission line support structure configuration 300 below. In some alternative examples, guy wires or other supplemental supporting structures may be used in conjunction with one or both of the first vertical shaft 204 and the second vertical shaft 206.

The crossarm 202 is attached to the first vertical shaft 204 at a first crossarm attachment point 280 and to the second vertical shaft 206 at a second crossarm attachment point 282. The crossarm 202 is able to be attached to the first vertical shaft 204 and the second vertical shaft 206 by any suitable technique such as by bolted flanges, bolted vangs, other attachments, or combinations of these. The first crossarm attachment point 280 is able to be near or at a top end of the first vertical shaft 204, and the second crossarm attachment point 282 is able to be near or at the top end of the second vertical shaft 206, which are points of those shafts that are near but removed from, or that are at an end of, those shafts that is opposite the ground 205. In some examples, the crossarm 202 is able to be attached to the first vertical shaft 204 and the second vertical shaft 206 at any suitable location.

In an example, at least one of the first vertical shaft 204, the second vertical shaft 206, and the crossarm 202 are able to be constructed of shafts with a circular cross-sections or with polygonal cross-sections. Such a shaft in an example is able to consist of a hollow tubular structure with a smooth outer surface, a hollow tube formed by multiple flat sides, such as a tube formed with a twelve (12) sided polygonal cross-section, a solid or hollow shaft of any cross-section and surface characteristic, or combinations of these. In further examples, the shafts and crossarm of the compact electric transmission line support structure configuration 200 are able to be constructed as a lattice structure, or according to any suitable design.

The compact electric transmission line support structure configuration 200 supports two circuits, a first circuit 201 and a second circuit 203. Each circuit includes three conductor bundles that carry three-phase high voltage power where each conductor bundle carries electric current for a different phase of the three-phase electric power. In further examples, a compact electric transmission line support structure similar to that described below is able to support only one circuit, such as only the first circuit 201.

In one example, each conductor bundle in the illustrated circuits is able to include two conductors. In that example, each circuit has three bundles of two conductors each. Further examples are able to have any number of conductors for each electrical phase, which are referred to herein as a conductor bundle. In various examples a "conductor bundle" is able to include only one conductor or any number of conductors. In the example where each conductor bundle includes three conductors, each circuit has three conductor bundles that are separated by a minimum phase separation distance, and each of those conductor bundles has three conductors.

The first circuit 201 includes a first circuit first conductor bundle 224, a first circuit second conductor bundle 228, and a first circuit third conductor bundle 244. As discussed above each of these conductor bundles is able to include only one conductor, or any number of conductors.

The first circuit first conductor bundle 224 is at a first circuit first conductor bundle attachment point that is connected to the first vertical shaft 204 at a first vertical shaft attachment point 220 by a first structural string 222. The first circuit second conductor bundle 228 is at a first circuit second conductor bundle attachment point that is connected to the second vertical shaft 206 at a second vertical shaft attachment point 232 by a second structural string 230. A third structural string 226 connects the first circuit first conductor bundle 224 to the first circuit second conductor bundle 228. The first circuit third conductor bundle 244 is at a first circuit third conductor bundle attachment point that is connected to the first vertical shaft 204 at a third vertical shaft attachment point 240 by a fourth structural string 242 and to the second vertical shaft 206 at a fourth vertical shaft attachment point 248 by a fifth structural string 246.

The third vertical shaft attachment point 240 in the illustrated example is below the first vertical shaft attachment point 220 and the fourth vertical shaft attachment point 248 is below the second vertical shaft attachment point 232. In an example, the first vertical shaft attachment point 220 and the second vertical shaft attachment point 232 are at the same level as each other, such that a line between them will be level. In an example, the third vertical shaft attachment point 240 and the fourth vertical shaft attachment point 248 are at the same level as each other, such that a line between them is level.

In an example, each structural string connecting the conductor bundles of the first circuit 201 support forces primarily in tension only. Although such structural strings are able to support a generally small amount of force in compression, such structural strings are generally considered tension only structural strings. In further examples, some or all of the structural strings are able to provide support in tension and compression. In some examples, each structural string is able to be constructed of a pair of parallel structural strings, or any number of structural strings in parallel, to increase strength.

The second circuit 203 includes a second circuit first conductor bundle 254, a second circuit second conductor bundle 258, and a second circuit third conductor bundle 274. As discussed above each of these conductor bundles is able to include only one conductor, or any number of conductors.

The second circuit 203 is connected to points on the first vertical shaft 204 and the second vertical shaft 206 that are below the vertical shaft attachment points for the first circuit 201. The connections of the second circuit 203 to the first vertical shaft 204 and the second vertical shaft 206 is similar to the above described connections of the first circuit 201 to those shafts.

The second circuit first conductor bundle 254 is at a second circuit first conductor bundle attachment point that is connected to the first vertical shaft 204 at a fifth vertical shaft attachment point 250 by a sixth structural string 252. The second circuit second conductor bundle 258 is at a second circuit second conductor bundle attachment point that is connected to the second vertical shaft 206 at a sixth vertical shaft attachment point 262 by a seventh structural string 260. An eighth structural string 256 connects the second circuit first conductor bundle 254 to the second circuit second conductor bundle 258. The second circuit third conductor bundle 274 is at a second circuit third conductor bundle attachment point that is connected to the first vertical shaft 204 at a seventh vertical shaft attachment point 270 by a ninth structural string 272 and to the second vertical shaft 206 at an eighth vertical shaft attachment point 278 by a tenth structural string 276.

The seventh vertical shaft attachment point 270 in the illustrated example is below the fifth vertical shaft attachment point 250 and the eighth vertical shaft attachment point 278 is below the sixth vertical shaft attachment point 262. In an example, the fifth vertical shaft attachment point 250 and the sixth vertical shaft attachment point 262 are at the same level as each other, such that a line between them will be level. In an example, the seventh vertical shaft attachment point 270 and the eighth vertical shaft attachment point 278 are at the same level as each other, such that a line between them will be level.

In an example, as discussed above with respect to the structural strings of the first circuit 201, each structural string connecting the conductor bundles of the second circuit 203 supports forces primarily in tension only as is described above. In further examples, some or all of the structural strings are able to provide support in tension and compression. In some examples, each structural string is able to be constructed of a pair of parallel structural strings to increase strength.

In an example, both of the first circuit 201 and the second circuit 203 are each configured to carry three-phase electric power at a transmission voltage of three hundred and forty-five Kilovolts (345 KV). In one such an example, the compact electric transmission line support structure configuration 200 is designed to have a separation of approximately sixteen feet (16 feet) between the first circuit first conductor bundle 224 and the first circuit second conductor bundle 228 and the first circuit third conductor bundle 244 is located at a vertical distance of about sixteen feet (16 feet) below a line connecting the first circuit first conductor bundle 224 and the first circuit second conductor bundle 228. In this example, the first circuit first conductor bundle 224 and the first circuit second conductor bundle 228 are designed to be located with a horizontal distance of approximately twelve to fourteen feet (12-14 feet) from its nearest vertical shaft. In some examples, the first vertical shaft 204 and the second vertical shaft are able to have heights of between one hundred and one hundred and sixty five feet (100-165 feet).

The above dimensions are an example of a compact electric transmission line support structure configuration 200. In general, dimensions of the compact electric transmission line support structure configuration 200 are able to be adjusted, according to techniques known by practitioners of ordinary skill in the relevant arts in light of the present discussion, to accommodate transmitting electric power at any desired voltage.

Figure 3:
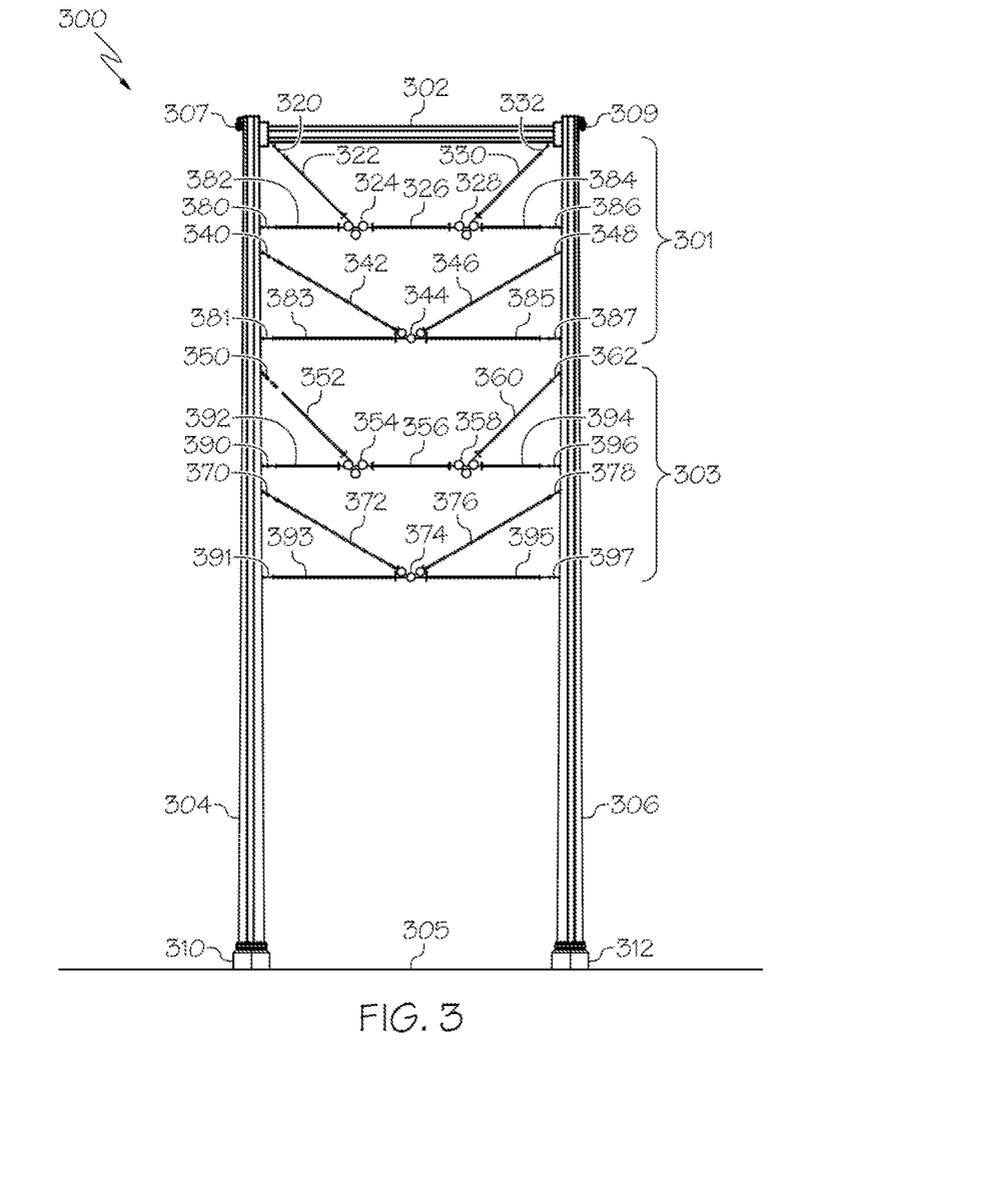
FIG. 3 illustrates an alternative compact electric transmission line support structure configuration, according to an example.

FIG. 3 illustrates an alternative compact electric transmission line support structure configuration 300, according to an example. The alternative compact electric transmission line support structure configuration 300 has a structure that is similar to the compact electric transmission line support structure configuration 200 with a different arrangement for some of the structural strings as is described below. The alternative compact electric transmission line support structure configuration 300 includes an alternative first vertical shaft 304, an alternative second vertical shaft 306 that is parallel to the alternative first vertical shaft 304 and an alternative crossarm 302. In some examples, the alternative first vertical shaft 304 and the alternative second vertical shaft 306 are substantially the same length as each other, but in other examples these shafts may be of differing length. The alternative first vertical shaft 304 and the alternative second vertical shaft 306 are mounted on the ground 305 and support a number of transmission lines above the ground 305 as is discussed below. In the illustrated example, the alternative first vertical shaft 304 is attached to the ground 305 by a first foundation 310 and the alternative second vertical shaft 306 is attached to the ground by a second foundation 312. In further examples, the alternative first vertical shaft 304 and the alternative second vertical shaft 306 are able to be mounted directly into the ground as is described above for the first vertical shaft 204 and the second vertical shaft 206. In some alternative examples, guy wires or other supplemental supporting structures may be used to support one or both of the alternative first vertical shaft 304 and the alternative second vertical shaft 306.

The alternative crossarm 302 is attached to the alternative first vertical shaft 304 at an alternative first crossarm attachment point 307 and to the alternative second vertical shaft 306 at an alternative second crossarm attachment point 309. The alternative crossarm 302 is able to be attached to the alternative first vertical shaft 304 and the alternative second vertical shaft 306 by any suitable technique such as by bolts, welds, other attachments, or combinations of these. The alternative first crossarm attachment point 307 is able to be near or at the top of the alternative first vertical shaft 304, and the alternative second crossarm attachment point 309 is able to be near the top of the alternative second vertical shaft 306, which are points that are near an end of the shafts that is opposite the ground 305. In some examples, the alternative crossarm 302 is able to be attached to the alternative first vertical shaft 304 and the alternative second vertical shaft 306 at any suitable location.

The alternative compact electric transmission line support structure configuration 300 supports two circuits, an alternative first circuit 301 and an alternative second circuit 303. As described above, each circuit includes three conductor bundles that carry three-phase high voltage power.

As discussed above with regards to the compact electric transmission line support structure configuration 200, the conductor bundles that are suspended by the alternative compact electric transmission line support structure configuration 300 are able to include one or more conductors where each conductor bundle carries electric current for a different phase of a three-phase electric power line.

The alternative compact electric transmission line support structure configuration 300 supports an alternative first circuit 301 and an alternative second circuit 303. The alternative first circuit 301 includes an alternative first circuit first conductor bundle 324, an alternative first circuit second conductor bundle 328, and an alternative first circuit third conductor bundle 344.

The alternative first circuit first conductor bundle 324 is at an alternative first circuit first conductor bundle attachment point that is connected to the alternative crossarm 302 at an alternative first attachment point 320 by an alternative first structural string 322. The alternative first circuit first conductor bundle 324 is also connected to the alternative first vertical shaft 304 at a first horizontal attachment point 380 by a first horizontal structural string 382. The alternative first circuit second conductor bundle 328 is at an alternative first circuit second conductor bundle attachment point that is connected to the alternative crossarm 302 at an alternative second attachment point 332 by an alternative second structural string 330. The alternative first circuit second conductor bundle 328 is also connected to the alternative second vertical shaft 306 at a second horizontal attachment point 386 by a second horizontal structural string 384. An alternative third structural string 326 connects the alternative first circuit first conductor bundle 324 to the alternative first circuit second conductor bundle 328.

The alternative first circuit third conductor bundle 344 is at an alternative first circuit third conductor bundle attachment point that is connected to the alternative first vertical shaft 304 at an alternative third vertical shaft attachment point 340 by an alternative fourth structural string 342. The alternative first circuit third conductor bundle 344 is also connected to the alternative first vertical shaft 304 at a third horizontal attachment point 381 by a third horizontal structural string 383. The alternative first circuit third conductor bundle 344 is connected to the alternative second vertical shaft 306 at an alternative fourth vertical shaft attachment point 348 by an alternative fifth structural string 346. The alternative first circuit third conductor bundle 344 is also connected to the alternative second vertical shaft 306 at a fourth horizontal vertical shaft attachment point 387 by a fourth horizontal structural string 385.

In an example, the alternative first structural string 322 and the alternative second structural string 330 are attached to the alternative crossarm 302 to form a forty five (45) degree angle. The alternative fourth structural string 342 and the alternative fifth structural string 346 attach to the alternative first vertical shaft 304 and the alternative second vertical shaft 306 so as to form a sixty (60) degree angle with the respective shaft.

The above dimensions are an example of an alternative compact electric transmission line support structure configuration 300. In general, dimensions of the alternative compact electric transmission line support structure configuration 300 are able to be adjusted, according to techniques known by practitioners of ordinary skill in the relevant arts in light of the present discussion, to accommodate transmitting electric power at any desired voltage.

The connection of the alternative second circuit 303 to the alternative first vertical shaft 304 and the alternative second vertical shaft 306 includes connections similar to those discussed above for the second circuit 203 of the compact electric transmission line support structure configuration 200. As depicted in the alternative compact electric transmission line support structure configuration 300, an alternative second circuit first conductor bundle 354 is at an alternative second circuit first conductor bundle attachment point that is connected to the alternative first vertical shaft 304 at an alternative fifth attachment point 350 by an alternative sixth structural string 352. The alternative second circuit second conductor bundle 358 is at an alternative second circuit second conductor bundle attachment point that is connected to the alternative second vertical shaft 306 at an alternative sixth attachment point 362 by an alternative seventh structural string 360. An alternative eighth structural string 356 connects the alternative second circuit first conductor bundle 354 to the alternative second circuit second conductor bundle 358.

The alternative second circuit third conductor bundle 374 is at an alternative second circuit third conductor bundle attachment point that is connected to the alternative first vertical shaft 304 at an alternative seventh vertical shaft attachment point 370 by an alternative ninth structural string 372. The alternative second circuit third conductor bundle 374 is connected to the alternative second vertical shaft 306 at an alternative eighth vertical shaft attachment point 378 by an alternative tenth structural string 376.

In addition to the similar connections described above for the second circuit 203, the alternative second circuit 303 further has horizontal structural strings to connect each conductor bundle to one or both of the alternative first vertical shaft 304 or the alternative second vertical shaft 306.

The alternative second circuit first conductor bundle 354 is also connected to the alternative first vertical shaft 304 by a fifth horizontal structural string 392. The alternative second circuit second conductor bundle 358 is also connected to the alternative second vertical shaft 306 by a sixth horizontal structural string 394. The alternative second circuit third conductor bundle 374 is also connected to the alternative first vertical shaft 304 by a seventh horizontal structural string 393 and to the alternative second vertical shaft 306 by an eighth horizontal structural string 395.

The physical relationship between the attachment points of the alternative compact electric transmission line support structure configuration 300 is similar to the physical relationship of the above described attachment points of the compact electric transmission line support structure configuration 200. In one example the attachment points for the alternative second circuit 303 are below the attachment points for the alternative first circuit 301. In an example, each structural string connecting the conductor bundles of the alternative first circuit 301 and the alternative second circuit 303 support forces primarily in tension only as is described above. In further examples, some or all of the structural strings are able to provide support in tension and compression. In example, each structural string is able to be constructed of a pair of parallel structural strings to increase strength.

Differences between the alternative compact electric transmission line support structure configuration 300 and the compact electric transmission line support structure configuration 200 include the above described horizontal structural strings and the attachment of some structural strings to the alternative crossarm 302 instead of the vertical shafts. The alternative compact electric transmission line support structure configuration 300 incorporates these additional horizontal structural strings to control the movement of the assembly under higher transverse loads, such as high winds or other forces.

In some examples, adjustments of the design of the compact electric transmission line support structure configuration 200 include one or more of the following. The first structural string 222 is able to be attached to the crossarm 202 in a manner similar to the connection of the alternative first circuit first conductor bundle 324 to the alternative crossarm 302 at the alternative first attachment point 320 by the alternative first structural string 322. The second structural string 230 is able to be attached to the crossarm 202 in a manner similar to the connection of the alternative first circuit second conductor bundle 328 to the alternative crossarm 302 at the alternative second attachment point 332 by the alternative second structural string 330. The configuration of a compact electric transmission line support structure configuration 200 in some examples is also able to be adjusted to include one or more of the first horizontal structural string 382, second horizontal structural string 384, third horizontal structural string 383, fourth horizontal structural string 385, fifth horizontal structural string 392, sixth horizontal structural string 394, seventh horizontal structural string 393, or the eighth horizontal structural string 395. In some examples, one or more of these horizontal structural strings are able to be incorporated into the compact electric transmission line support structure configuration 200 in order to connect one or more associated conductor bundles to the first vertical shaft 204 or the second vertical shaft 206 in a manner similar to that described for the alternative compact electric transmission line support structure configuration 300.

Figure 4:
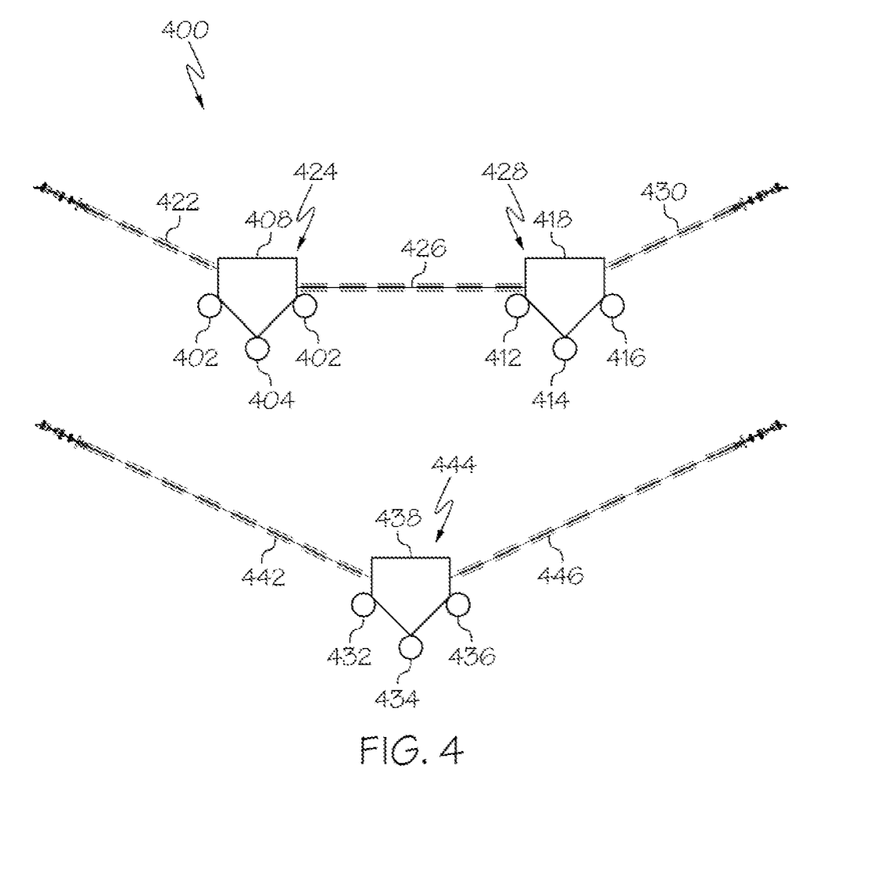
FIG. 4 illustrates conductor bundle attachment points, according to an example.

FIG. 4 illustrates conductor bundle attachment points 400, according to an example. The conductor bundle attachment points 400 depicts the three conductor bundle attachment points and associated structural strings for the three conductor bundles of one circuit that are connected to a compact electric transmission line support structure. In the present discussion, a conductor bundle connection point is to be broadly understood as referring to any point or structure where one or more conductors of a conductor bundle attach to one or more structural strings that connect that conductor bundle to components of a compact electric transmission line support structure. The conductor bundle attachment points 400 is an example of conductor bundle attachment points that are able to be incorporated into any of the above described circuits, such as the first circuit 201. The following discussion refers to elements of the first circuit 201 but it is to be understood that the below description is able to be applied to any circuit discussed above. In further examples, compact electric transmission line support structures are able to include conductor bundle attachment points that have any design.

The illustrated conductor bundle attachment points 400 depicts conductor bundles where each conductor bundle for each electrical phase has three (3) conductors. In further examples, similar conductor bundle attachment points are able to support any number of conductors, including one conductor per phase or any number in a plurality of conductors per phase.

The conductor bundle attachment points 400 includes a first conductor bundle 424 that is an example of the first circuit first conductor bundle 224 and a second conductor bundle 428 that is an example of the first circuit second conductor bundle 228. The first conductor bundle 424 is attached to a first structural string 422 and to a third structural string 426. The arrangement of the first structural string 422 and the third structural string 426 is similar to that discussed above for the first circuit 201, where the first structural string 422 connects the first conductor bundle 424 to a vertical shaft (not shown) and the third structural string attaches the first conductor bundle 424 to the second conductor bundle 428. A second structural string 430 is similar to the above described second structural string 230 and connects the second conductor bundle 428 to another vertical shaft (not shown).

The first conductor bundle 424 has a first yoke plate 408 that supports a first conductor bundle first conductor 402, a first conductor bundle second conductor 404, and a first conductor bundle third conductor 406. The first yoke plate 408 is an example of a first conductor attachment point in this illustrated example. The first yoke plate 408 also attaches to the first structural string 422 and to the third structural string 426. The configuration of the first yoke plate 408 secures these three conductors in a triangular arrangement with attachments to the first structural string 422 and to the third structural string 426 arranged so as to cause the first conductor bundle first conductor 402 and the first conductor bundle third conductor 406 to be level and the first conductor bundle second conductor 404 located at a position in between and below the other two conductors.

The second conductor bundle 428 has a second yoke plate 418 that in the illustrated example is similar to the first yoke plate 408 by being rotated around its vertical axis. The second yoke plate 418 supports a second conductor bundle first conductor 412, a second conductor bundle second conductor 414, and a second conductor bundle third conductor 416. The second yoke plate 418 is an example of a second conductor attachment point in this illustrated example. The second yoke plate 418 also attaches to the second structural string 430 and to the third structural string 426. The configuration of the second yoke plate 418 secures these three conductors in a triangular arrangement with attachments to the second structural string 430 and to the third structural string 426 arranged so as to cause the second conductor bundle first conductor 412 and the second conductor bundle third conductor 416 to be level with each other and the second conductor bundle second conductor 414 located at a position in between and below the other two conductors.

The conductor bundle attachment points 400 includes a third conductor bundle 444 that is an example of the first circuit third conductor bundle 244. The third yoke plate 438 is an example of a third conductor attachment point in this illustrated example. The third conductor bundle 444 is attached to a fourth structural string 442 and to a fifth structural string 446. The arrangement of the fourth structural string 442 and the fifth structural string 446 is similar to that discussed above for the first circuit 201, where the fourth structural string 442 connects the third conductor bundle 444 to a vertical shaft (not shown) and the fifth structural string 446 connects the third conductor bundle 444 to another vertical shaft (not shown).

The third conductor bundle 444 has a third yoke plate 438 that supports a third conductor bundle first conductor 432, a third conductor bundle second conductor 434, and a third conductor bundle third conductor 436. The third yoke plate 438 also attaches to the fourth structural string 442 and to the fifth structural string 446. The configuration of the third yoke plate 438 secures these three conductors in a triangular arrangement with attachments to the fourth structural string 442 and to the fifth structural string 446 arranged so as to cause the third conductor bundle first conductor 432 and the third conductor bundle third conductor 436 to be level and the third conductor bundle second conductor 434 located at a position in between and below the other two conductors.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An electric transmission line support structure, comprising:
    a ground mounted first vertical shaft;
    a ground mounted second vertical shaft parallel to the first vertical shaft;
    a crossarm connecting the first vertical shaft to the second vertical shaft;
    a first conductor bundle attachment point connected to the first vertical shaft at a first vertical shaft attachment point by a first structural string;
    a second conductor bundle attachment point connected to the second vertical shaft at a second vertical shaft attachment point by a second structural string and to the first conductor bundle attachment point by a third structural string;
    a third conductor bundle attachment point connected to the first vertical shaft at a third vertical shaft attachment point by a fourth structural string and to the second vertical shaft at a fourth vertical shaft attachment point by a fifth structural string, where the third vertical shaft attachment point is below the first vertical shaft attachment point, and the fourth vertical shaft attachment point is below the second vertical shaft attachment point;
    a fourth conductor bundle attachment point connected to the first vertical shaft at a fifth vertical shaft attachment point by a sixth structural string, where the fifth vertical shaft attachment point is below the third vertical shaft attachment point;
    a fifth conductor bundle attachment point connected to the second vertical shaft at a sixth vertical shaft attachment point by a seventh structural string and to the fourth conductor bundle attachment point by an eighth structural string, where the sixth vertical shaft attachment point is below the fourth vertical shaft attachment point; and
    a sixth conductor bundle attachment point connected to the first vertical shaft at a seventh vertical shaft attachment point by a ninth structural string and to the second vertical shaft at an eighth vertical shaft attachment point by a tenth structural string, where the seventh vertical shaft attachment point is below the fifth vertical shaft attachment point, and the eighth vertical shaft attachment point is below the sixth vertical shaft attachment point.

2. The electric transmission line support structure of claim 1, where at least one of the first structural string, the second structural string, the third structural string, the fourth structural string, and the fifth structural string primarily support forces in tension.

3. The electric transmission line support structure of claim 1, where the crossarm attaches to the first vertical shaft at a point removed from a top end of the first vertical shaft and attaches to the second vertical shaft at a point removed from a top end of the second vertical shaft.

4. The electric transmission line support structure of claim 1, wherein at least one of the first vertical shaft and the second vertical shaft comprise a shaft with a polygonal cross section.

5. The electric transmission line support structure of claim 1, wherein at least one of the first vertical shaft and the second vertical shaft comprise a shaft with a polygonal cross section.

6. The electric transmission line support structure of claim 1, wherein at least one of the first vertical shaft or the second vertical shaft comprise a lattice structure.

7. The electric transmission line support structure of claim 1, further comprising:
   a first horizontal structural string connecting the first conductor bundle attachment point to the first vertical shaft at a first horizontal attachment point; and
   a second horizontal structural string connecting the second conductor bundle attachment point to the first vertical shaft at a second horizontal attachment point.

8. The electric transmission line support structure of claim 1, further comprising:
   a third horizontal structural string connecting the third conductor bundle attachment point to the first vertical shaft at a third horizontal attachment point; and
   a fourth horizontal structural string connecting the third conductor bundle attachment point to the second vertical shaft at a fourth horizontal attachment point.

9. The electric transmission line support structure of claim 1, further comprising:
   a fifth horizontal structural string connecting the fourth conductor bundle attachment point to the first vertical shaft at a fifth horizontal attachment point; and
   a sixth horizontal structural string connecting the fifth conductor bundle attachment point to the first vertical shaft at a sixth horizontal attachment point.

10. The electric transmission line support structure of claim 1, further comprising:
   a seventh horizontal structural string connecting the sixth conductor bundle attachment point to the first vertical shaft at a seventh horizontal attachment point; and
   an eighth horizontal structural string connecting the sixth conductor bundle attachment point to the second vertical shaft at an eighth horizontal attachment point.

11. An electric transmission line support structure, comprising:
   a ground mounted first vertical shaft;
   a ground mounted second vertical shaft parallel to the first vertical shaft;
   a crossarm connecting the first vertical shaft to the second vertical shaft;
   a first conductor bundle attachment point connected to the crossarm at a first crossarm attachment point by a first structural string;
   a second conductor bundle attachment point connected to the crossarm at a second crossarm attachment point by a second structural string and to the first conductor bundle attachment point by a third structural string;
   a third conductor bundle attachment point connected to the first vertical shaft at a third vertical shaft attachment point by a fourth structural string and to the second vertical shaft at a fourth vertical shaft attachment point by a fifth structural string, where the third vertical shaft attachment point and the fourth vertical shaft attachment point are below the crossarm;
   a fourth conductor bundle attachment point connected to the first vertical shaft at a fifth vertical shaft attachment point by a sixth structural string, where the fifth vertical shaft attachment point is below the third vertical shaft attachment point;
   a fifth conductor bundle attachment point connected to the second vertical shaft at a sixth vertical shaft attachment point by a seventh structural string and to the fourth conductor bundle attachment point by an eighth structural string, where the sixth vertical shaft attachment point is below the fourth vertical shaft attachment point; and
   a sixth conductor bundle attachment point connected to the first vertical shaft at a seventh vertical shaft attachment point by a ninth structural string and to the second vertical shaft at an eighth vertical shaft attachment point by a tenth structural string, where the seventh vertical shaft attachment point is below the fifth vertical shaft attachment point, and the eighth vertical shaft attachment point is below the sixth vertical shaft attachment point.

12. The electric transmission line support structure of claim 11, further comprising:
   a first horizontal structural string connecting the first conductor bundle attachment point to the first vertical shaft at a first horizontal attachment point; and
   a second horizontal structural string connecting the second conductor bundle attachment point to the first vertical shaft at a second horizontal attachment point.

13. The electric transmission line support structure of claim 11, further comprising:
   a third horizontal structural string connecting the third conductor bundle attachment point to the first vertical shaft at a third horizontal attachment point; and
   a fourth horizontal structural string connecting the third conductor bundle attachment point to the second vertical shaft at a fourth horizontal attachment point.

14. The electric transmission line support structure of claim 11, further comprising:
   a fifth horizontal structural string connecting the fourth conductor bundle attachment point to the first vertical shaft at a fifth horizontal attachment point; and
   a sixth horizontal structural string connecting the fifth conductor bundle attachment point to the first vertical shaft at a sixth horizontal attachment point.

15. The electric transmission line support structure of claim 11, further comprising:
   a seventh horizontal structural string connecting the sixth conductor bundle attachment point to the first vertical shaft at a seventh horizontal attachment point; and
   an eighth horizontal structural string connecting the sixth conductor bundle attachment point to the second vertical shaft at an eighth horizontal attachment point.

\* \* \* \* \*